United States Patent [19]

Smaldone

[11] 4,047,870
[45] Sept. 13, 1977

[54] AUTOMATIC PODIATRIC CONTROL MOLDER

[76] Inventor: Fulvio Smaldone, 313 E. North Ave., Northlake, Ill. 60164

[21] Appl. No.: 691,510

[22] Filed: June 1, 1976

[51] Int. Cl.$^2$ .............................................. B29C 3/06
[52] U.S. Cl. .................................. 425/151; 425/161; 425/167; 425/389
[58] Field of Search .............. 425/150, 151, 152, 161, 425/162, 167, 389; 100/53

[56] References Cited

U.S. PATENT DOCUMENTS

| | | | |
|---|---|---|---|
| 3,191,235 | 6/1965 | Rougement | 425/152 X |
| 3,334,383 | 8/1967 | Irvine | 425/389 |
| 3,346,923 | 10/1967 | Brown et al. | 425/162 |
| 3,642,415 | 2/1972 | Johnson | 425/389 |
| 3,744,949 | 7/1973 | Hehl | 425/152 X |
| 3,804,003 | 4/1974 | Hehl | 425/152 X |

*Primary Examiner*—Ronald J. Shore

*Attorney, Agent, or Firm*—Merriam, Marshall, Shapiro & Klose

[57] ABSTRACT

A molding press for forming articles from thermoplastic sheet materials comprises a generally hollow, fluid-tight housing, the lower surface of which comprises a flexible gas-tight diaphragm. The housing is movably positioned above a flat base, on which there is placed a mold covered with a softened sheet of thermoplastic material. During a molding cycle, the housing is lowered and interlocked with the base bringing the diaphragm adjacent the mold, and a fluid under pressure is introduced into the housing, causing the diaphragm to exert a uniform force on the thermoplastic sheet and forcing it to assume the contours of the mold. The base is equipped with mechanical and electrical interlock means which cooperate with the housing to insure that the fluid pressure cannot be applied until the housing and the base are safely interlocked and that the housing cannot be separated from the base while fluid pressure is supplied to the housing.

3 Claims, 12 Drawing Figures

AUTOMATIC PODIATRIC CONTROL MOLDER

This invention relates to a molding press and more particularly to a pneumatically actuated molding press adapted for forming thermoplastic sheet material into a desired contour by applying pneumatic pressure to a flexible diaphragm which forces an adjacent sheet of softened thermoplastic material against a mold having the desired shape. More particularly, the invention relates to such a molding press provided with automatic controls for controlling the application and release of pneumatic pressure and regulating the timing of the molding cycle.

Certain plastic articles are conveniently formed by heating a sheet of thermoplastic material, superimposing it on a mold having the contour desired in the finished article and apply a uniform pressure to the upper surface of the heated plastic sheet to cause it to follow the contours of the mold, with which it remains in contact until the material has cooled and set. One example of such a plastic article is a molded podiatric control device used to relieve a variety of foot disorders, which is formed to follow the contours of the lower surface of a patient's foot. In the past, podiatric devices of this kind have been made by producing a plaster cast of a patient's foot, inverting the mold so as to place the bottom surface of the foot mold in the uppermost position, heating a piece of appropriate thermoplastic material, placing the softened plastic material on the top surface of the mold, pressing the thermoplastic sheet into contact with the mold by means of a flexible material held in a frame and maintaining the pressure until the temperature of the thermoplastic sheet falls enough to make the product rigid. While this method of operation is effective if carefully carried out, it is relatively slow, inefficient and highly dependent on the individual skill of the operator.

The present invention provides a device for carrying out the molding of podiatric devices such as those described, as well as other similar products, in an automatic, safe, reproducible and high efficient manner. Briefly described, the device of the invention comprises a generally hollow, fluid-tight housing, the lower surface of which comprises a flexible gas-tight diaphragm. The housing is movably positioned above a flat base, on which there is placed a mold covered with a softened sheet of thermoplastic material. During a molding cycle, the housing is lowered and interlocked with the base, bringing the diaphragm adjacent the mold, and a fluid under pressure is introduced into the housing, causing the diaphragm to exert a uniform force on the thermoplastic sheet and forcing it to assume the contours of the mold. The base is equipped with mechanical and electrical interlock means which cooperate with the housing to insure that the fluid pressure cannot be applied until the housing and the base are safely interlocked and that the housing cannot be separated from the base while fluid pressure is supplied to the housing.

The invention will be better understood from the following detailed description thereof, taken in conjunction with the accompanying drawings, in which.

Figure 1:
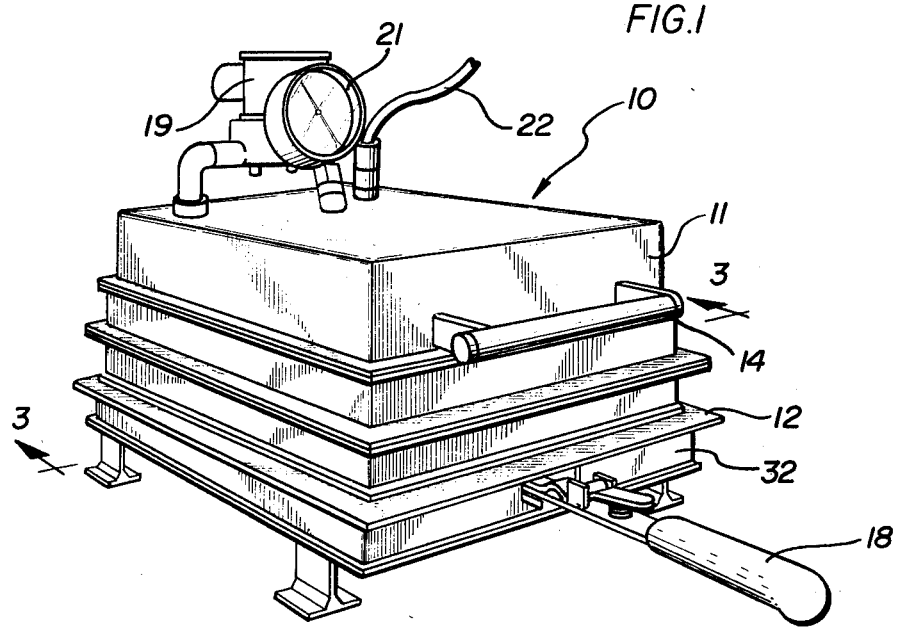
FIG. 1 is a perspective of a preferred embodiment of the invention showing the upper housing in closed position on the base, with the control handle in the locked operative position used during a molding operation.

As shown in the Figures, the molding press 10 of the invention comprises two major operating parts, an upper generally hollow housing 11 and a lower base 12, interconnected by hinges 13 which permit the housing to be rotated upwardly away from contact with the base by means of handle 14. Arranged about the perimeter of housing 11 where it comes into contact with base 12 are a plurality of notched locking cleats 16a, b, c, d, positioned to project through suitably spaced openings 17 into the interior of base 12. The operation of the press is controlled by handle 18, shown in FIG. 1 in the locked position required during operation of the press and in the unlocked position in FIG. 2 which permits lifting housing 11 to expose the interior of the press. Housing 11 is provided with an electrically controlled exhaust valve 19, a pressure gauge 21 and an inlet conduit 22 providing a gas, suitably air, under a superatmospheric pressure which is controlled by a system hereinafter to be described.

Figure 3:
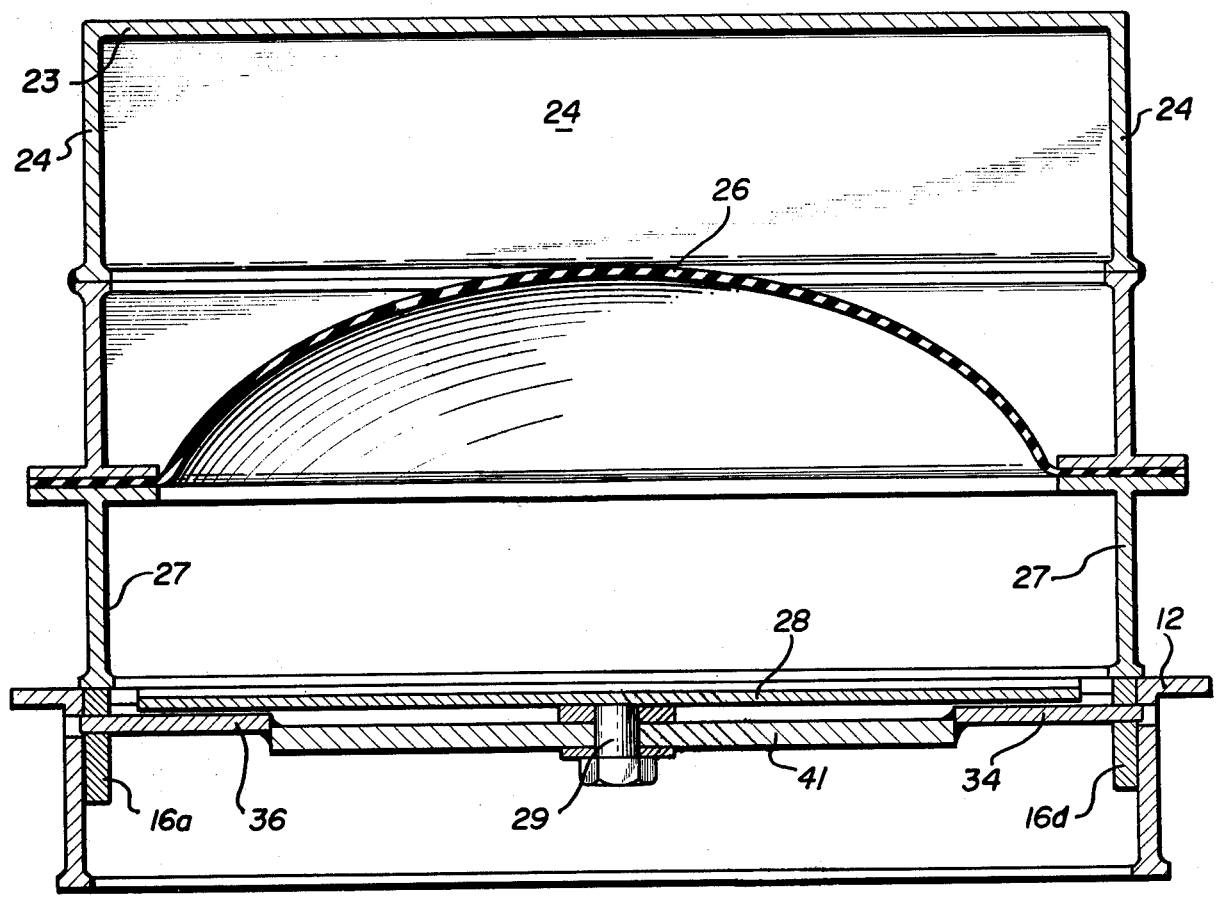
FIG. 3 is a cross-sectional view along the line 3—3 of FIG. 1.

As shown in FIG. 3, housing 11 comprises a structure including a rigid top 23, rigid side walls 24 and a flexible gas-tight diaphragm or bladder 26 which seals off the bottom of the housing to create a fluid-tight chamber. Rails 27 support housing 11 a suitable distance above the upper face plate 28 of base 12 to permit insertion of the mold to be used.

Figure 2:
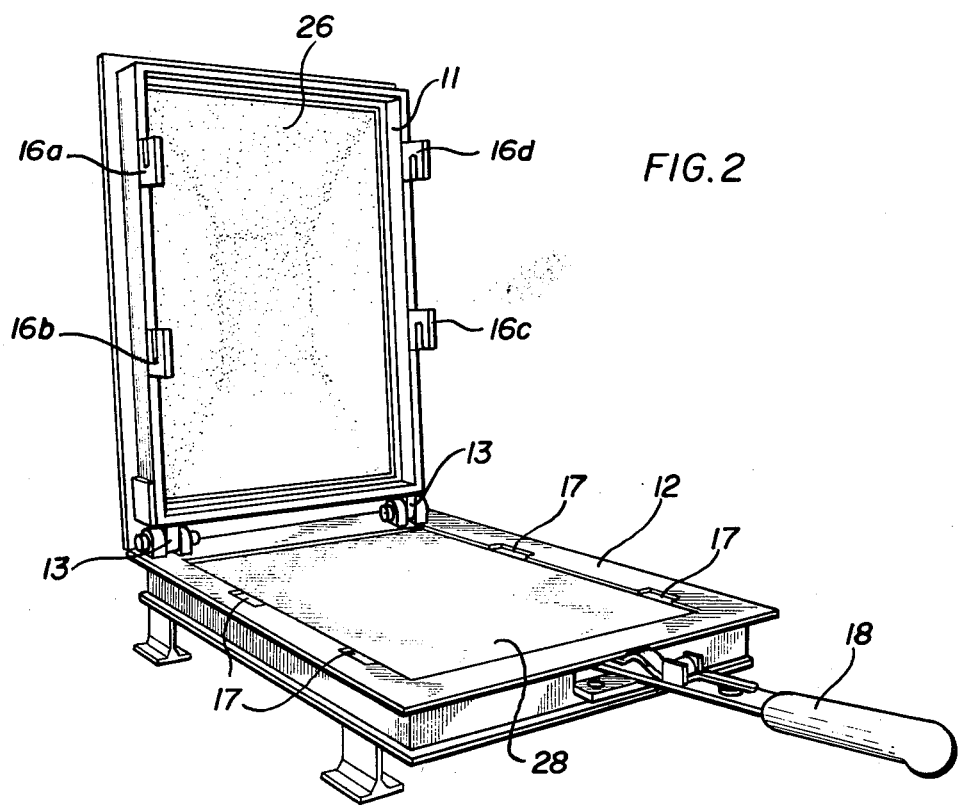
FIG. 2 is a perspective of the embodiment of FIG. 1 with the housing raised for insertion of the plastic material and the mold and the control handle in the unlock position.

Depending from the bottom of face plate 28 and pivoted for rotation about pin 29 is lock plate 31 (FIG. 5), to the forward edge of which is rigidly attached handle 18, which in turn passes through a suitable opening in the front plate 32 of base 12 (FIG. 2). Attached to the outer edges of lock plate 31 and extending outwardly therefrom are lock blades 33, 34, 36, and 37 (FIG. 5).

With housing 11 in the closed position shown in FIGS. 3 and 5, cleats 16 extend below face plate 28 so that by rotation of handle 18 to the locked position shown in FIG. 5, lock blades 33, 34, 36, and 37 are caused to enter the notches in the cleats, thereby preventing housing 33 from being raised while handle 18 is in the locked position, to which it is normally urged by handle spring 38.

Figure 5:
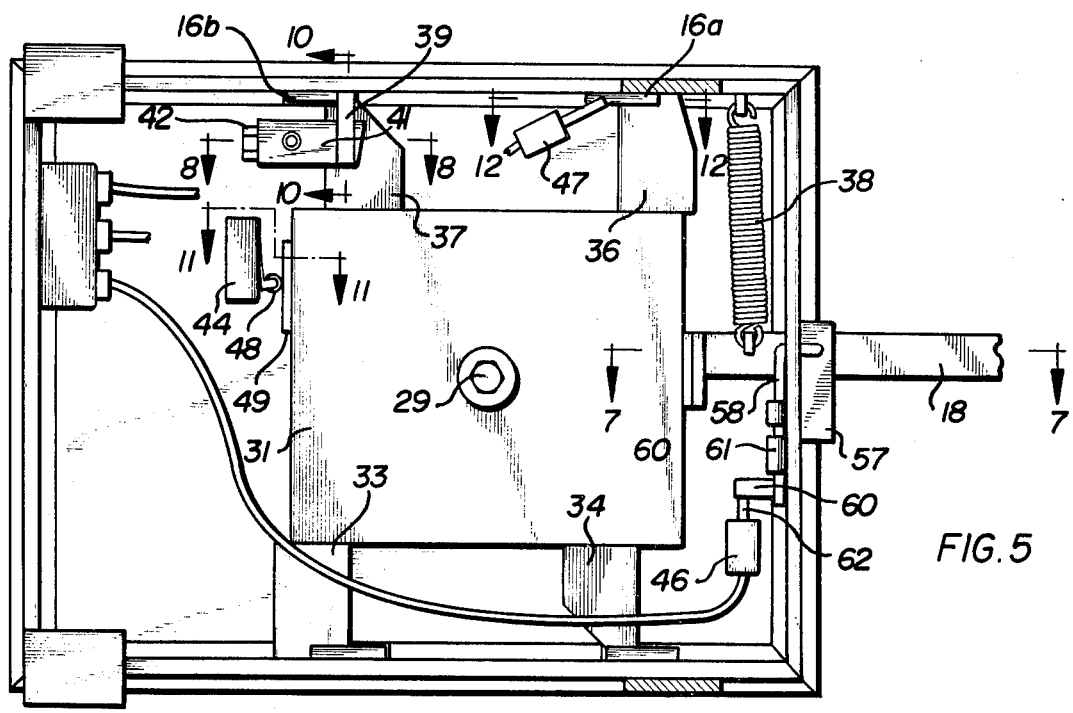
FIG. 5 is a bottom view of the embodiment of FIG. 1 showing the control system in a locked position to permit operation of the device.
Figure 8:
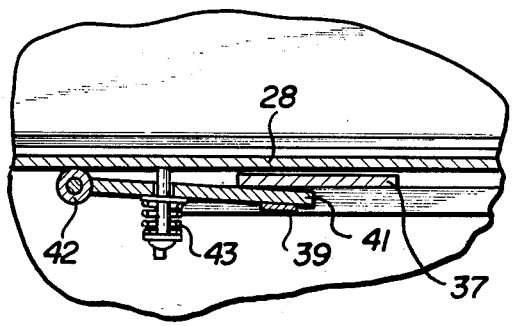
FIG. 8 is a sectional view along the line 8—8 of FIG. 5 showing a mechanical safety interlock system in a locked condition, which can be achieved only when the housing is closed.
Figure 9:
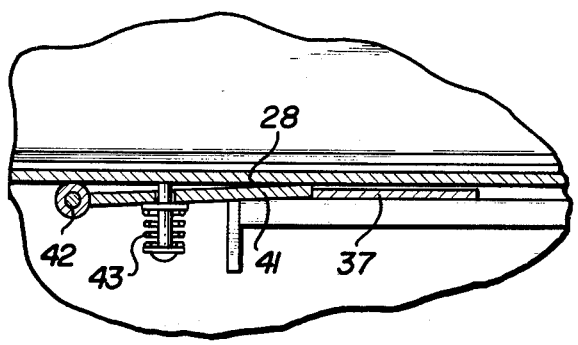
FIG. 9 is a sectional view along the line 9—9 of FIG. 6 showing the mechanical interlock system in the open position, which prevents operation of the press.
Figure 10:
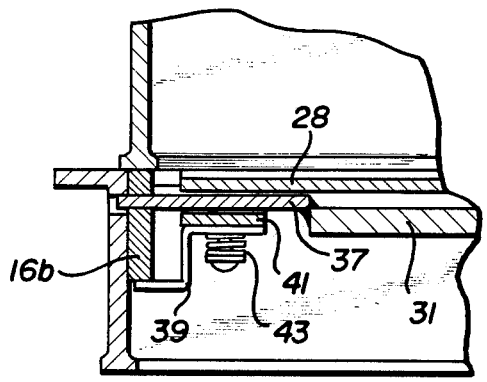
FIG. 10 is a sectional view along the line 10—10 of FIG. 5, showing another view of the construction of the mechanical interlock system.

The press is provided with a mechanical interlock system, details of which are shown in FIGS. 8 and 9, which prevents handle 18 from being moved to the locked position shown in FIG. 5, unless housing 11 is closed and in contact with base 12. The mechanical interlock system is controlled by one, e.g., 16b, of the locking cleats connected to the perimeter of housing 11. When housing 11 is closed against base 12, the bottom of cleat 16b projecting through its corresponding opening 17 (FIGS. 8 and 10) bears against bar 39 which is transversely attached to and extends beyond the edge of interlock plate 41 which is normally urged in an upward direction about hinge 42 by spring 43. When cleat 16b depresses plate 41 a sufficient distance to permit blade 37 to pass above it, as shown in FIG. 8, handle 18 can be rotated to achieve the locked position. On the other hand, if housing 11 is not in the closed position, so that plate 41 is not depressed, as shown in FIG. 9, plate 41 blocks blade 37 and prevents rotation of handle 18.

Figure 6:
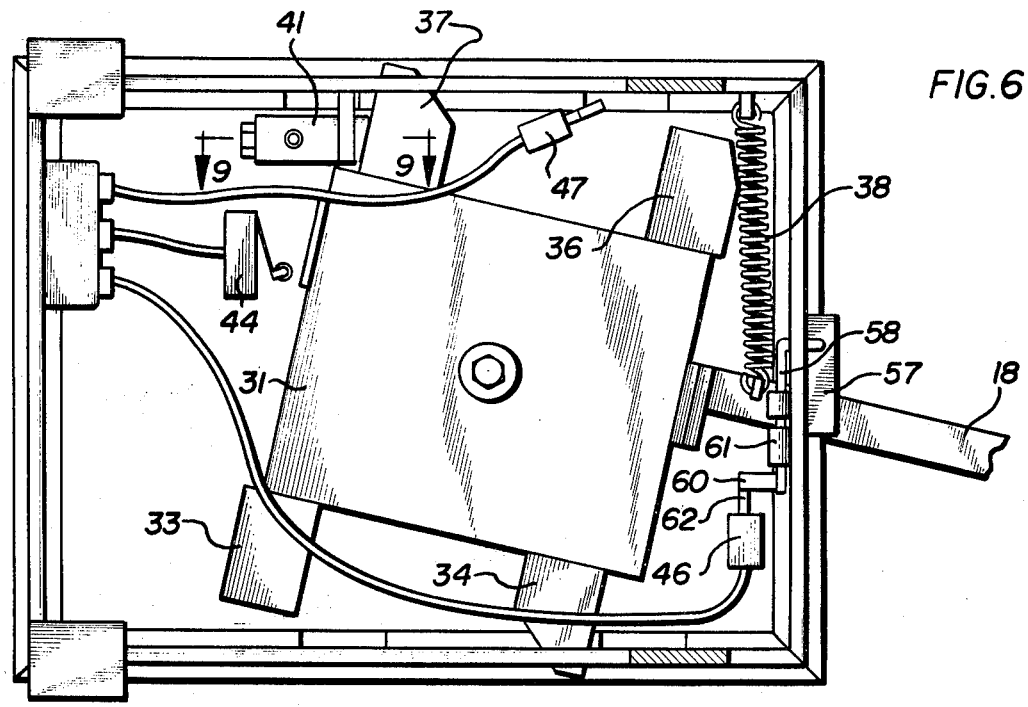
FIG. 6 is a bottom view of the embodiment of FIG. 1 showing the control system in an unlocked position permitting separation of the upper housing from the base and preventing application of fluid pressure.
Figure 11:
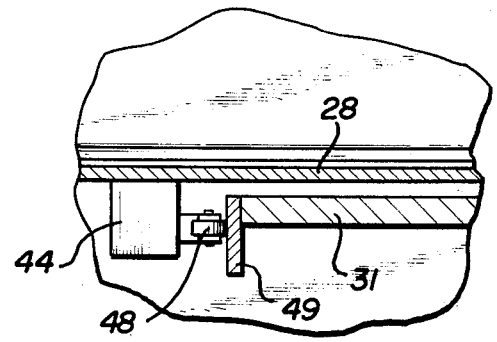
FIG. 11 is a sectional view along the line 11—11 of FIG. 5 showing a portion of the electrical system controlling the application of fluid pressure.

The mechanical interlock system described is functionally related with an electrical interlock system which controls the application and duration of pneumatic pressure to housing 11 during a molding operation. The electrical control system comprises in part three electrical switches 44, 46, and 47 (FIGS. 5 and 6), all of which must be simultaneously actuated to permit the control system to supply pneumatic molding pressure. Switch 44 (FIGS. 5 and 11) is closed by contact of its control arm 48 with bar 49 attached to the edge of lock plate 31. Actuation of switch 44 occurs only when lock plate 41 is fully rotated by handle 18 to the locked position of the press.

Figure 12:
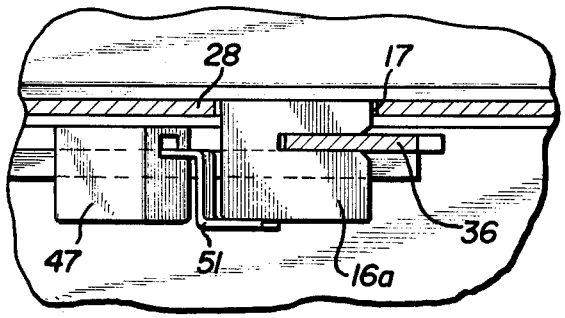
FIG. 12 is a sectional view along the line 12—12 showing another aspect of the mechanical and electrical interlock systems.

Switch 47 is closed when locking cleat 16a (FIG. 12) contacts the control arm 51 of the switch, thus indicating that housing 11 has been fully closed onto base 12.

Figure 7:
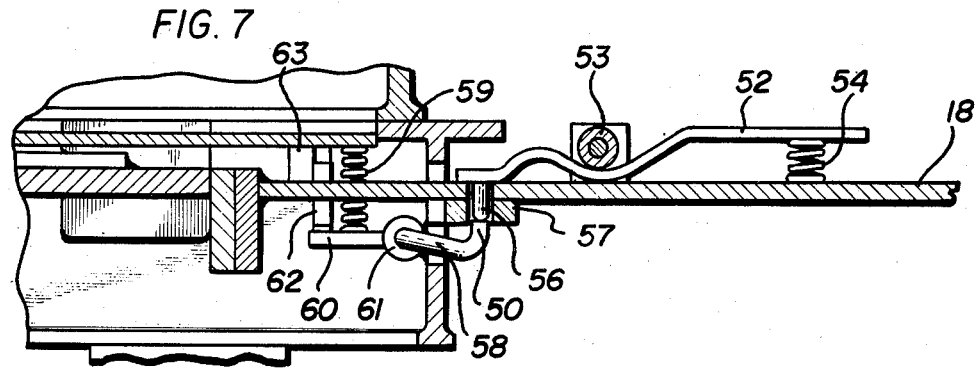
FIG. 7 is a cross-sectional view along the line 7—7 of FIG. 5 showing the construction of the control handle.

Switch 46 works in conjunction with a mechanical handle interlock system shown in FIG. 7. As shown, handle 18 is provided with a handle lock lever 52 upwardly biased about pivot 53 by spring 54. The end of lever 52 opposite spring 51 is provided with a downwardly extending pin adapted to project into aligned holes in handle 18 and handle lock plate 57 attached to the front plate 32 of base 12. Switch actuating rod 58, held for rotation by bushing 61, has an upwardly extending outer end 50 positioned to enter the hole in plate 57 under the influence of spring 59. The inner end 60 of rod 58 bears against control arm 62 of switch 63, closing the switch when the outer end 50 of rod 58 is depressed by pin 56, as in the locked position shown in FIG. 7. In order to permit rotation of handle 18 to open the press after a molding operation, lock lever 52 must be depressed to lift pin 56 out of the hold in plate 57. When pin 56 is lifted, however, spring 59 forces the outer end end 50 of rod 58 into the hole in plate 57, permitting the inner end 60 of rod 58 to drop under the bias of spring 59, thus opening switch 63.

In order for gas under pressure to be supplied to the press, in a manner to be described, all of switches 44, 46, and 47 must be actuated, insuring respectively that lock plate 41 is fully rotated, that housing 11 is fully lowered and that handle 18 is locked into position. When all of these conditions exist, the press is ready for operation under the control of a system shown in FIG. 4.

Figure 4:
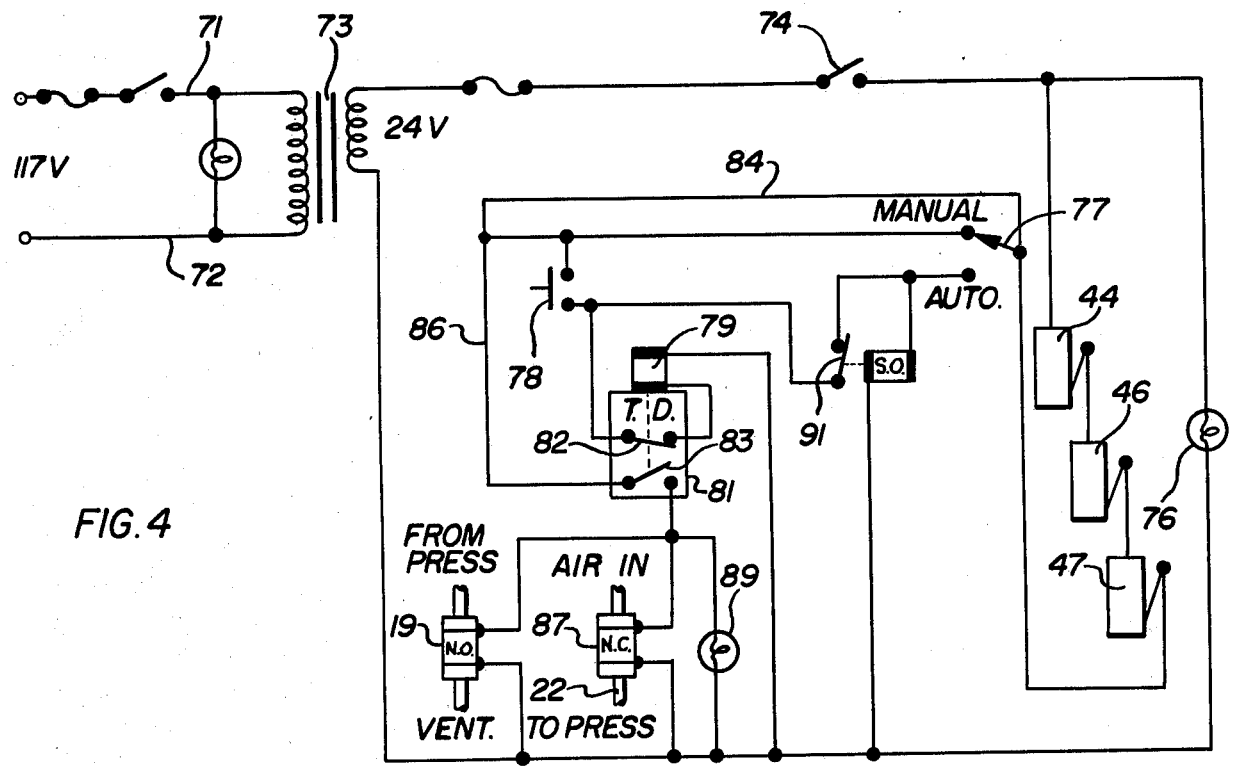
FIG. 4 is a schematic diagram of an electrical circuit used to control the safety devices regulating the application of fluid pressure and the timing of the molding cycle.

As shown in FIG. 4, A.C. power supplied by conductors 71 and 72 is reduced by transformer 73 to a low value, suitably on the order of 24 volts.

When switch 74 is closed, power is available to the control circuit as indicated by the lighting of lamp 76. Switch 77 permits the operator to select either a manual or an automatic mode of operation. With the switch 77 in the manual position as shown, and provided that each of switches 44, 46, and 47 is actuated as described above, power is available at push-button switch 78, which when closed supplies power to the solenoid 79 of time delay relay 81 through normally closed contacts 82. Actuation of relay 81 simultaneously closes normally open contacts 83 while opening contacts 82. Relay 81 is suitably of a commercially available hydropneumatic type which, once actuated, remains in an actuated condition for a predetermined length of time, in this case, the length of time required for a molding cycle. When contacts 83 are closed, power is supplied through conductors 84 and 86, which by-pass switches 77 and 78, to the solenoids of electrically actuated gas valves 87 and 19. Valve 87, which is normally closed, controls the flow of compressed gas from a regulated source, not shown, to conduit 22 leading to housing 11. When valve 87 is actuated by closing of contacts 83, the valve opens and compressed gas is supplied to the housing 11 of the press. Simultaneously, normally open exhaust valve 19, which communicates with housing 11, is closed by power supplied through the closing of contacts 83, thus permitting the gas pressure in the housing to build up to its operating value. At the end of the molding operation, determined by the operating cycle of relay 81, contacts 83 open, removing power from both of the valves 87 and 19. Valve 87 closes, blocking the flow of compressed gas, while valve 19 opens to a suitable vent, premitting the gas pressure which has built up in housing 11 to dissipate. Lamp 89 lights during the period that gas pressure is supplied to the housing to indicate that a molding cycle is in effect.

In order to operate the press in an automatic mode, switch 77 is turned to the automatic position. Provided that all of switches 44, 46, and 47 have been actuated as previously described, power is immediately available to solenoid 79 through normally closed contacts 82 and normally closed relay 91. Actuation of relay 81 then supplies power to the gas control valves 87 and 19, as previously described, until the end of the operating cycle. Relay 91 is used to prevent recycling of the process in the automatic mode, which would occur as soon as relay 81 completed its timing cycle. Relay 91 is "slow-to-operate" (S.0.). The normally closed contacts of relay 91 remain closed a sufficient time to permit relay 81 to be actuated. As soon as this occurs, however, the contacts of relay 91 open, thus preventing power from being applied to relay 81 until relay 91 is deactivated by opening the press, thus causing switches 44, 46, and 47 to be deactivated, as previously described. Thus, in the automatic mode, the molding cycle starts as soon as handle 17 is rotated to the locked position. The cycle then stops automatically and cannot be repeated without opening and relocking the press.

It will be seen that the invention provides a molding press which not only insures uniform application of pressure against a softened thermoplastic sheet to be formed against a mold, but also contains mechanical and electrical interlock features which control and time the application of molding pressure and which prevent operation of the device under any condition which might present a hazard to the operator.

The foregoing detailed description has been given for clearness of understanding only and no unnecessary limitations should be understood therefrom, as modifications will be obvious to those skilled in the art.

I claim:

1. A molding press for molding a thermoplastic sheet material to a desired contour, said press comprising a base and a rigid generally hollow housing overlying said base and movable vertically with respect thereto, said housing having an opening facing said base and a flexible sheet-like diaphragm covering said opening to from a fluid-tight chamber;
    means for pressurizing said housing with a fluid to cause said flexible diaphragm to apply molding force to a sheet of softened thermoplastic material covering a mold positioned on said base to cause said sheet to assume the contours of said mold;
    said press including mechanical interlock means for interlocking said housing with said base and electrical control means for controlling the application of fluid pressure to said housing, said mechanical and electrical means being interrelated to prevent application of fluid pressure except when said housing and said base are interlocked,
    said mechanical interlock means comprising one or more vertical cleats attached to said housing and arranged to project into said base when said press is closed,
    a horizontal plate carried in said base and rotatable about a vertical axis, and
    one or more horizontal lock blades outwardly extending from said lock plate, each of said blades being adapted to interlock with a corresponding one of said cleats on rotation of said lock plate to prevent separation of said housing from said base;
    said electrical control means comprising an electrical circuit including in series:
    a power source,
    an electrically acutated pneumatic control valve for regulating the application of pneumatic pressure to said chamber, and
    at least one electrical switch actuated by said mechanical means,
    whereby pneumatic pressure cannot be applied to said housing except when said housing and said base are interlocked.

2. A molding press in accordance with claim 1 including handle means connected to said lock plate extending out of said base, for rotating said lock plate between an open position and a locked position;
    handle lock means for holding said handle in the locked position;
    handle lock release means for releasing said handle lock; and
    an electrical switch connected in series in said electrical circuit, said switch opening when said handle lock means is released and said handle is moved from said locked position.

3. A press in accordance with claim 2 wherein said mechanical interlock means further includes an interlock plate and a spring biasing said interlock plate to a first position which blocks rotation of said lock plate when said press is open, said interlock plate being movable against the bias of said spring by one of said cleats to a second position permitting rotation of said lock plate when said press is closed.

* * * * *

UNITED STATES PATENT AND TRADEMARK OFFICE
CERTIFICATE OF CORRECTION

PATENT NO. : 4,047,870
DATED : September 13, 1977
INVENTOR(S) : Fulvio Smaldone

It is certified that error appears in the above–identified patent and that said Letters Patent are hereby corrected as shown below:

Col. 1, line 18, "apply" should be --applying--.

Col. 3, line 37, "31" should be --41--.

Col. 5, line 15, claim 1, "from" should be --form--.

Col. 6, line 10, after "mechanical" and before "means" --interlock-- should be inserted.

Signed and Sealed this

*Seventh* Day of *February 1978*

[SEAL]

*Attest:*

RUTH C. MASON
*Attesting Officer*

LUTRELLE F. PARKER
*Acting Commissioner of Patents and Trademarks*